United States Patent [19]
Marsch et al.

[11] 3,821,908
[45] July 2, 1974

[54] RETAINER FOR PLANET PINION SHAFT

[75] Inventors: James E. Marsch, Brookfield; Joseph R. Hoepfl, Greenfield, both of Wis.

[73] Assignee: Allis Chalmers Corporation, Milwaukee, Wis.

[22] Filed: Dec. 12, 1972

[21] Appl. No.: 314,339

[52] U.S. Cl. ................................................ 74/801
[51] Int. Cl. ........................................... F16h 1/28
[58] Field of Search .................................... 74/801

[56] References Cited
UNITED STATES PATENTS
2,505,002  4/1950  Orr ........................................ 74/801
2,999,401  9/1961  Bedard et al. ........................ 74/801

*Primary Examiner*—Leonard H. Gerin
*Attorney, Agent, or Firm*—Arthur L. Nelson

[57]  ABSTRACT

A pin retainer for a planet pinion shaft providing angular and axial alignment of a pinion shaft with means for providing lubrication of the pinion gear bearing.

9 Claims, 3 Drawing Figures

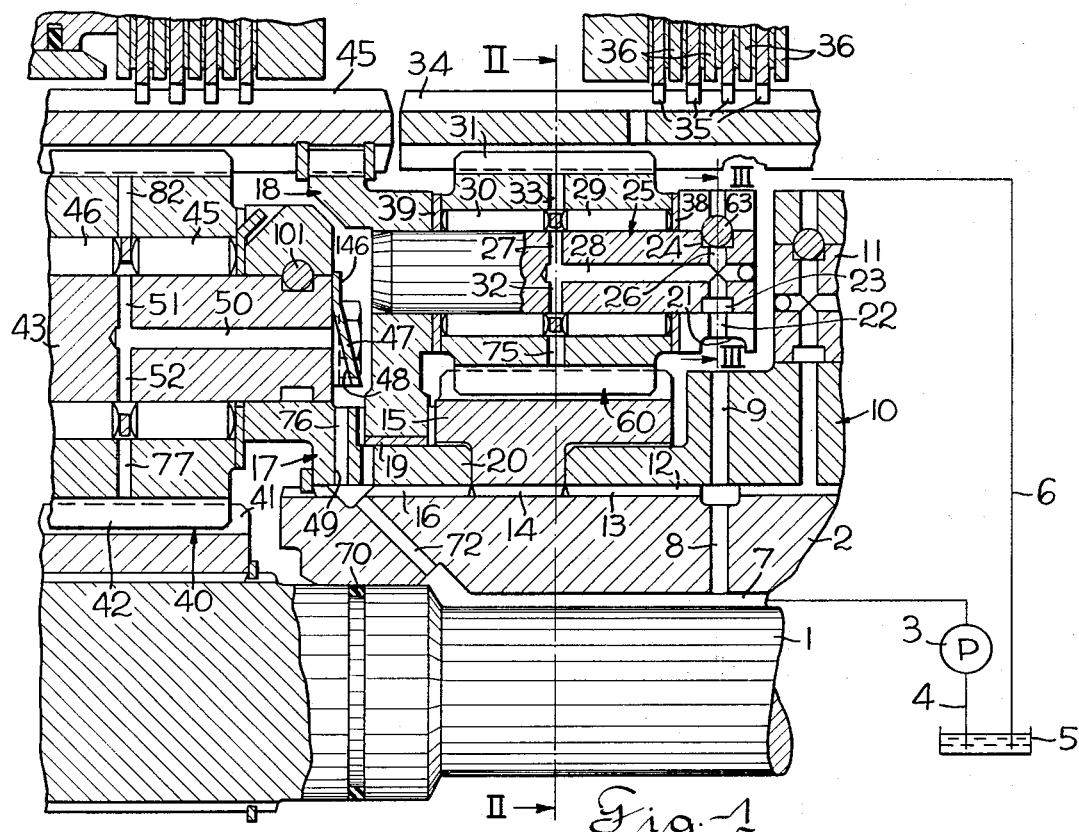
Fig. 1
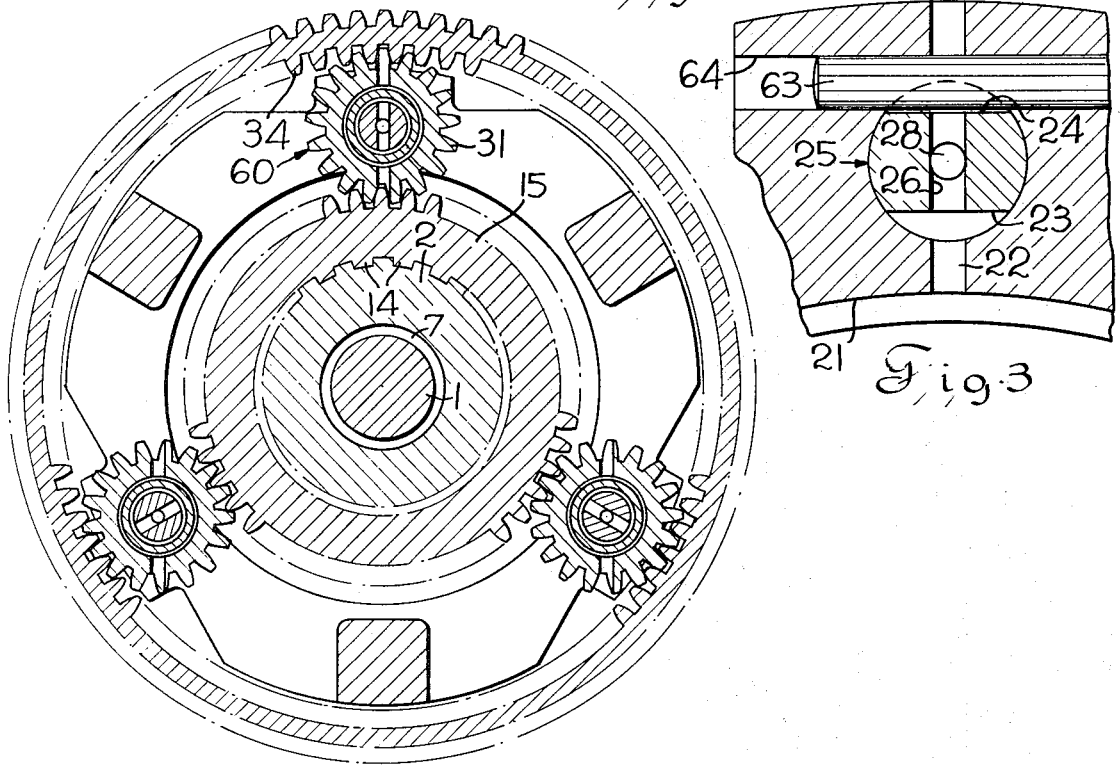
Fig. 2
Fig. 3

RETAINER FOR PLANET PINION SHAFT

This invention relates to a shaft retainer mechanism and more particularly to a pin retainer for maintaining axial and angular alignment of the planet shaft and provide lubrication to the pinion bearing of a planetary gearset.

The use of planetary gearsets in power transmission is quite conventional. The mounting of planet pinions, however, can present a problem. The shaft supporting the planet pinion must be retained in the carrier to prevent it from sliding axially outward from the planetary carrier. It is further noted that lubrications of the planet gear bearings can also be a problem since the planet gears are mounted radially from a main drive shaft in any axial passages contained therein. It is fundamental that these gears be constantly lubricated to assure reliability of the transmission.

Accordingly, this invention provides a means whereby the planet pinion shaft for supporting the planet pinion gear bearing is fixed in the planetary carrier to assure a firm mounting for the pinion gears. An additional provision is provided in the planetary carrier and the pinion shaft for constant lubrication of the planet gear and the planet gear bearing to assure long life of the planetary gearset.

It is an object of this invention to provide a pin retainer for axial and angular alignment of a pinion gear shaft.

It is another object of this invention to provide a pin retainer for shaft alignment and to provide flow of lubricating oil for the pinion gear and bearing.

It is a further object of this invention to provide a pin retainer for axial and angular alignment and to direct flow of lubricating oil to the planet pinion gear.

It is a further object of this invention to provide a pin retainer for axial alignment of the planet pin in the carrier and angular alignment of the planet pin for aligning lubrication oil passages for lubrication of the planet pinion gear and bearing.

The objects of this invention are accomplished through the use of a planetary gearset operating concentrically with the main drive shaft. Axial lubricating passages on the main drive shaft are supplied with pressurized lubricating fluid. The planetary carrier has an annular recess to receive oil from the pressurized lubricating oil system. Radial passages extending radially in the carrier supply oil to radial and axial passages in the pinion gear shaft. The oil is supplied to the pinion gear bearing and also to the gear teeth of the pinion gear as it meshes with the ring gear and sun gear. Accordingly, a pin mounted in a chordal opening of the planetary carrier is partially received in a mating slot in the planet gear shaft. This arrangement permits the use of a retainer pin which is mounted with an interference fit in the carrier to retain the pin in the carrier and the slot of the pinion gear shaft. The pin is positioned in a chordal relationship to the planetary carrier and the planet gear shaft so that radial forces on the pin do not produce any force tending to disassemble the pin from the carrier assembly. Accordingly, lubricating passages through the planetary carrier and the planet pinion shaft provide lubrication from a source of lubrication oil to the planet pinion to maintain lubrication of the planet gear bearing and the planet pinion teeth.

Referring to the drawings, the preferred embodiment of this invention is illustrated.

FIG. 1 illustrates a cross-section view taken through a planet pinion and the main drive shaft.

FIG. 2 illustrates a cross-section view taken on line II—II of FIG. 1.

FIG. 3 illustrates an enlarged cross-section view taken on line III—III of FIG. 1.

Referring to the drawings, the main drive shaft 1 is rotatably mounted within the quill shaft 2. A lubrication oil pump (at the location 3) receives lubrication oil through the conduit 4 from the reservoir 5. A return conduit 6 returns lubricating oil to the reservoir 5.

The pump 3 supplies pressurized oil to the passage between the quill shaft 2 and the main drive shaft 1. The axial passage 7 is in communication with the radial passage 8 to supply pressurized fluid to the radial passage 9 in the planetary carrier 10. The planetary carrier 10 supports the planet pinion shaft 11 in which the lubricating passages are formed for lubrication of a planet gearset not shown in the right hand portion of the drawing.

The quill shaft 2 is formed with splines 12 which engage mating spline portion 13 of the carrier 10, spline portion 14 of the sun gear 15 as well as spline portion 16 of the carrier 17 of another planetary gearset.

A planetary carrier 18 is rotatably supported on a bushing 19 which circles an axial flange 20 of a planetary carrier 17. Planetary carrier 18 forms an annular recess 21 on its internal periphery aligned with the passage 9. The annular recess 21 is in communication with a port 22 and a slot 23. Slot 23 is connected to the slot 24 of the planet pinion shaft 25 through the diametrical passage 26. A second diametrical passage 27 is also formed in the pin 25. Passages 26 and 27 are connected to each other by the axial passage 28. The radial passage 27 extends to the bearing assemblies 29 and 30 as shown. The bearing assemblies 29 and 30 rotatably support a planet gear 31 which is also formed with radial passages 75 and 33. The radial passages 75 and 33 lubricate the planet gear 31 as well as the ring gear 34 and sun gear 15. The ring gear 34 is splined on its external periphery to receive mating clutch discs 35 which are adapted for engaging clutch discs 36 of a clutch assembly. The planetary carrier 18 carries the planet pin 25 which is embraced by the bearing assemblies 29 and 30. The bearing assemblies rotatably support the planet pinion 31 while the washers 38 and 39 axially engage the planet pinion 31 on its ends.

Planetary gearset 40 which includes the planetary carrier 17 shows a modification of the lubricating oil system. The sun gear 41 is splined to the drive shaft 1 and engages the pinion 42. The pinion 42 rotates on bearing assemblies 45 and 46 which embrace the pinion gear shaft 43. The pinion 42 engages the ring gear 45.

The planetary carrier 17 is provided with a radial flange 146 having a plurality of axially recessed portions 47 which form passages 48. Accordingly, the radial passage 49 in the planetary carrier 17 is in communication with the passage 7 which receives oil which is sprayed into the recessed portion 47 and flows into the axial passage 50 and radial connecting passages 51 and 52 to supply lubrication to the bearing assemblies 45 and 46 as well as the radial passages 82 and 77 for lubricating the pinions, ring gear, and sun gear.

Referring to FIG. 3, the planetary gearset 60 is shown in a fragmentary section more clearly illustrating the lubricating passages. Annular recess 21 supplies lubricating fluid to the radial passage 22 and the slots 23 and 24. The retainer pin 63 is received within the chordal opening 64. Preferably the pin 63 has an interference fit with the opening 64 to retain it in this position. The pin 63 is also partially received in the slot 24 to maintain the angularity of the pin 25. In this position the radial passage 22 is in alignment with the opening 26 to permit the flow of fluid through the axial passage 28 for lubrication of the bearing assemblies and the pinion gears. The pin 63 closes the opening 22 at the outer periphery to prevent the flow of fluid through this opening. FIG. 2 is a cross-section view of the planetary gearset 60 showing the relative positions of the sun gear, ring gear and planet gears in planetary gearset.

The operation of this device will be described in the following paragraph.

The pump 3 pressurizes fluid which is supplied to the passage 7. The seal ring 70 seals between the main drive shaft 1 and the quill shaft 2. The radial passage 8 supplies pressurized fluid to the planetary gearset 60 while the passage 72 supplies pressurized fluid to the planetary gearset 40. The pressurized fluid in passage 8 is supplied through the passage 9 and is sprayed into the annular recess 21 of the carrier 18. The centrifugal force of the rotating assembly of a planetary gearset 60 causes the fluid to rotate outwardly within the radial passage 22 and the radial passage 26 of the shaft 25. The oil is also permitted to flow through the axial passage 28 in the shaft 25 and the radial passages 27 and 32. These passages being in communication with the radial passages 33 and 75 permit lubrication of the pinion 31, the ring gear 34, and sun gear 15 as well.

Similarly the passage 72 supplies pressurized fluid to the radial passage 49 which sprays lubricating fluid into the passage 48. The oil sprayed into the passage 48 then passes through the axial passage 50 and the radial passages 51 and 52 and the radial passages 82 and 77 to lubricate the pinion gear 42 as well as the ring gear 45 and sun gear 41 of the planetary gearset 40.

Referring to FIG. 3, it can be seen that the pin 63 is firmly seated in the chordal opening 64 and partially received in the slot 24. The pin 63 aligns the shaft 25 axially and angularly so the diametrical passage 26 is in alignment with the radial passage 22 to provide communication between these passages for lubrication of the bearing assemblies 29 and 30. The pin also aligns the shaft 25 with the carrier and maintains its alignment of the shaft in the carrier. The pin 63 being positioned in a chordal position relative to the carrier eliminates any radial thrust due to centrifugal force. With an interference fit, the pin is firmly locked in the carrier assembly and maintains the shaft 25 in the carrier.

The modification shown of the planetary gearset 40 provides a similar lubricating means. The planetary gearset 40 operates similarly to that of the planetary gearset 60. Pressurized lubricating fluid passes through passage 49 and is discharged into the passage 48 formed by the flange 146. The fluid is deflected into the axial passage 50 and the radial passages 51 and 52. The lubricating fluid lubricates the bearing assemblies 45 and 46 and also passes through the radial ports 77 and 82. Accordingly, the bearing assemblies and the planetary gears are lubricated by this means. The retainer pin 101 retains the shaft 43 in its axial aligned position as well as its angular alignment maintaining the radial ports 51 and 52 in a radial position relative to the planetary gearset concentric center which is the rotating axis of the sun gear 41.

The embodiments of the invention in which an exclusive property or privilege is claimed are defined as follows:

1. A planet pinion shaft retainer for a planetary gearset comprising, a planetary carrier, a planet gear, means defining a planet gear shaft opening in said carrier, a planet gear shaft mounted in said carrier rotatably supporting said planet gear, means defining a chordal pin opening in the outer peripheral portion of said planetary carrier intersecting the outer peripheral portion of the planet gear shaft opening, means defining a pin slot in the periphery of said planet gear shaft for alignment with said pin opening in said carrier, a retainer pin partially received in said pin opening of said carrier and in said slot of said planet gear shaft for locking said planet gear shaft in axial and angular alignment relative to said carrier.

2. A planet pinion shaft retainer for a planetary gearset as set forth in claim 1 wherein said carrier defines fluid passages for transmitting lubricating fluid through said carrier, said planet gear shaft defines lubricating fluid passages in communication with said passages in said carrier for lubricating the bearing of said planet gear.

3. A planet pinion shaft retainer for a planetary gearset as set forth in claim 1 including means defining radial passages in said planetary carrier, means defining radial and axial passages in said planet gear shaft in communication with the radial passages of said carrier when said retainer pin aligns said planet gear shaft for transmitting lubricating fluid to the bearing of said planet gear.

4. A planet pinion shaft retainer for planetary gearset as set forth in claim 1 including, means defining passage means in said planet pinion shaft, means defining supply passages on said carrier for supplying lubricating fluid to said passage means in said planet pinions shaft for lubricating said planet pinion.

5. A planet pinion shaft retainer for a planetary gearset as set forth in claim 1 including means defining passages in said planet gear shaft, means defining radial passages in said planet gear for transmitting lubricating fluid from said planet gear shaft to the periphery of said planet gear for lubrication of the gears of said planetary gearset.

6. A planet pinion shaft retainer for a planetary gearset as set forth in claim 1 including means defining passages in said planetary carrier for transmitting lubricating fluid, means defining passages in said planet pinion shaft for transmitting lubricating fluid for lubrication of said shaft and said planet gear, a sun gear and drive shaft including means defining passages adapted for supplying lubricating fluid to the passage means in said planetary carrier for lubrication of said planetary gearset.

7. A planet pinion shaft retainer for a planetary gearset as set forth in claim 1 including, means defining lubricating fluid passage means in said planetary carrier, means defining an annular recess on the internal periphery of said planet carrier adapted for reception of lubricating fluid from a source of lubricating fluid, means defining lubricating fluid passages in said planet gear shaft for transmitting lubricating fluid from said cerrier to the external periphery of said planet gear shaft for lubricating, said planet gear.

8. A planet pinion shaft retainer for a planetary gearset as set forth in claim 1 including means defining a radial passage in said carrier adapted for transmitting lubricating fluid, means defining an axial and diametrical passages in said planet gear shaft for transmitting lubricating fluid for lubricating said planet gear, said means defining said pin slot communicating with one of said diametrical passages, said retainer pin thereby blocking transmission fluid through said diametrical passages to direct the flow of lubricating fluid through said passages in said planet gear shaft.

9. A planet pinion shaft retainer for a planetary gearset as set forth in claim 1 wherein said means defining said opening in said carrier defines a chordal opening in said carrier, said retainer pin and said carrier defining an interference fit to frictionally engage said retainer pin and maintain said pin in its fixed position in said planetary gearset.

* * * * *